United States Patent [19]

Hotaling et al.

[11] Patent Number: 5,360,572
[45] Date of Patent: Nov. 1, 1994

[54] AEROGEL MESH GETTER

[75] Inventors: Steven P. Hotaling, Liverpool, N.Y.; Deidra A. Dykeman, Kent, Wash.

[73] Assignee: The United States of America as represented by the Secretary of the Air Force, Washington, D.C.

[21] Appl. No.: 196,929

[22] Filed: Feb. 15, 1994

Related U.S. Application Data

[60] Division of Ser. No. 981,923, Nov. 12, 1992, Pat. No. 5,308,533, which is a continuation-in-part of Ser. No. 800,817, Nov. 29, 1991, abandoned.

[51] Int. Cl.$^5$ ............... H01J 17/18; B01D 49/00; B01D 53/02; H01L 21/306; A61L 9/00; G03G 21/00
[52] U.S. Cl. ............... 252/181.6; 252/181.1; 445/55; 502/233; 502/405; 502/407; 502/439; 210/188; 210/407; 210/502.1; 437/10; 437/12; 423/210; 423/215.5; 454/187; 355/300; 422/4; 422/120; 96/154
[58] Field of Search ............... 252/181.1, 181.6, 315.6; 502/233, 405, 407, 439; 445/55; 210/188, 407, 502.1; 437/10, 12; 423/210, 215.5; 55/74, 83, 387; 156/DIG. 66; 454/187; 355/300; 422/4, 120

[56] References Cited

U.S. PATENT DOCUMENTS

| | | |
|---|---|---|
| 3,672,833 | 6/1972 | Teichner et al. ............... 23/182 R |
| 3,889,119 | 6/1975 | Whicker et al. ............... 250/352 |
| 4,053,565 | 10/1977 | Krekeler et al. ............... 423/338 |
| 4,146,497 | 3/1979 | Barosi et al. ............... 252/181.6 |
| 4,327,065 | 4/1982 | von Dardel et al. ............... 423/338 |
| 4,444,316 | 4/1984 | Casberg ............... 206/524.4 |
| 4,619,908 | 10/1986 | Cheng et al. ............... 502/214 |
| 4,630,095 | 12/1986 | Otsuka et al. ............... 357/78 |
| 4,717,708 | 1/1988 | Cheng et al. ............... 502/233 |
| 4,839,085 | 6/1989 | Sandrock et al. ............... 252/181.6 |
| 4,849,378 | 7/1989 | Hench et al. ............... 252/315.6 |
| 4,922,157 | 5/1990 | Van Engen et al. ............... 315/248 |
| 4,977,035 | 12/1990 | Travis et al. ............... 428/550 |
| 4,996,002 | 2/1991 | Sandrock et al. ............... 252/181.6 |
| 5,004,036 | 4/1991 | Becker ............... 164/97 |
| 5,015,411 | 5/1991 | Tom et al. ............... 252/194 |
| 5,020,583 | 6/1991 | Aghajanian et al. ............... 164/97 |

*Primary Examiner*—Robert L. Stoll
*Assistant Examiner*—Joseph D. Anthony
*Attorney, Agent, or Firm*—Donald J. Singer; Thomas C. Stover

[57] ABSTRACT

A porous light-weight getter which collects particulate and molecular contaminates that is believed a significant improvement over the prior art is provided in which a metal mesh matrix is coated with a low-density porous aerogel. In the prior art bare metal mesh matrices have been employed as getters, which are subject to ablation from high-velocity contaminant particles. In the composite getter of the present invention, the low-density aerogel coating protects the enclosed metal matrix from ablation and also can attract and hold the incoming high-velocity particle. On its part, the metal mesh provides reinforcing support to the aerogel covering and also good thermal conductivity therein so that such covering can be cooled to the low temperatures that attract such contaminants. The invention further provides method for manufacture of the composite getters of the invention. Such composite getters are useful in decontamination in semiconductor manufacturing processes and storage thereof and in decontaminating optical systems including a space-based telescope.

In other embodiments, the getter of the invention can be mounted in air ducts to serve as a filter therefor, can be mounted in a photocopier for capture of toner fog, can be mounted in areas of semiconductor manufacturing for collecting contaminates proximate thereto, can be mounted in operating rooms, cleanrooms, in storage areas for surgical instruments, in spacecraft and the like for decontamination thereof.

12 Claims, 5 Drawing Sheets

AEROGEL MESH GETTER

STATEMENT OF GOVERNMENT INTEREST

The invention described herein may be manufactured and used by or for the Government for governmental purposes without the payment of any royalty thereon.

This application is a division of application Ser. No. 07/981,923, filed Nov. 12, 1992, now U.S. Pat. No. 5,308,533 which in turn is a continuation-in-part of application Ser. No. 07/800,817 filed Nov. 29, 1991 now abandoned.

BACKGROUND OF THE INVENTION

1. Field of the Invention

This invention relates to a lightweight getter for contaminants, particularly an aerogel mesh getter therefor.

2. The Prior Art

Optical sensors in space-based astronomical observatories and other observation satellites are often required to detect low-radiance objects against relatively bright backgrounds such as the Earth and the sun. This requires that the optical system have a high out-of-field-of-view rejection capability and thus low scatter optical surfaces (mirrors and lenses). Launch, deployment and satellite operations such as gimbal motions create vibration-induced contaminants which have a high probability of becoming attached to optical surfaces or accumulating in the sensor's field of view. Propulsion effluents, nonmetallic material outgasing and the natural space environment also produce contaminants that can deposit onto surfaces sensitive thereto such as lenses, mirrors and solar collectors.

To alleviate the above surface contamination problem, certain devices have been developed which direct a spray, jet or beam at a surface to dislodge the contaminant particles therefrom. This is, e.g. a gas-sold snow mixture spray or ion beams are applied to remove contaminants from the optical surfaces. However, one removed from such surface, these species must be collected to prevent their re-deposition on an optical surface and/or their floating in the field of view of an optical instrument.

In the prior art, collectors known as "getters" have been employed for the purpose of collection or capture of the above contaminants. These prior art getters have taken the form of one or more layers of metal mesh, charged plates and charged dielectric plates (electrets). However the metal mesh device, e.g., of aluminum alloy, are brittle and have desorption rates and ablation tendencies. The charged plates require kilovolts of charge which is unacceptable for a satellite due to, e.g. arcing problems in space. The charged dielectric plates have capture radii too low to be useful in practice.

Further, high performance optical and micro electronic components have ever tightening contamination specifications placed upon them. Contamination is now seen as a major reason for the degradation of space based optical systems and failure of high density integrated circuits used through industrial and military systems. Contamination is currently controlled by the use of cleanrooms, process monitors and manual cleaning techniques which include solvent wipes, strippable coatings, wet-dry processes, ultrasonics and air purges. The major disadvantages of these techniques are their inability to remove submicron particles and the potential of leaving molecular residues on the cleaned surfaces. Some of these cleaning techniques can be damaging to delicate surfaces and/or have toxic waste products; for, e.g. biomedical applications such as virology research laboratories.

To address the above contaminant problem, certain contamination removal and collection techniques have been attempted in the prior art. However, some of these removal techniques create a flux of removed contaminates which can then re-deposit on clean surfaces or be ejected into the environment. Current collection devices, such as filters, charged metal plates and screens and charged dielectrics have collection efficiencies and capture radii incommensurate with the new nano-scale semiconductor devices, optical systems and biomedical cleanliness requirements.

Accordingly, there is a need and market for a contaminant getter that is effective and otherwise obviates the above prior art shortcomings.

There has now been discovered a lightweight contaminant getter that collects and holds particulate and molecular contaminants without the above-noted high voltage and ablation problems.

SUMMARY OF THE INVENTION

Broadly, the present invention provides a porous lightweight getter which collects particulate and molecular components comprising, a metal mesh matrix and a low-density, porous, aerogel coated on said matrix.

The aerogel collects and contains the above contaminants while the metal mesh provides support for such aerogel and a thermally conductive path by which such getter can be maintained at a desired temperature for collection purposes.

Also provided is a method for forming a composite getter which collects and holds comtaminants comprising covering a metal mesh matrix with an aerogel.

Further provided is a method for preparing a lightweight getter which collects contaminants comprising condensing an aerogel precursor oil, e.g. a silica oil onto a metal mesh substrate, catalyzing said oil to form a gel and extracting solvent from said gel to dry same to a silica aerogel, to form a getter with a porous low-density aerogel covering on a metal mesh matrix.

By "low density" aerogel, as used herein, is meant a) aerogel having a density of from 1 to 10 mg/cc (ULD aerogel) and b) aerogel having a density of from 10 to 500 mg/cc (LD aerogel).

By "covering" the metal mesh matrix, as used herein, is meant coating or encapsulating such matrix with an aerogel.

By "coating" such matrix is meant applying a surface aerogel layer thereon, e.g. per FIG. 5, hereof.

By "encapsulating" such matrix is meant applying said aerogel throughout and on such matrix, e.g. per FIG. 6 hereof.

By "AMCC" as used herein, is meant Aerogel Mesh Contamination Collector of the invention. It includes a stand alone device which acts as a "flypaper" type collector. The AMCC can have arbitrary geometric shapes and topological and morphological natures depending on function.

By "AMCC/CRS" as used herein, is meant the above AMCC in a configuration with a Contamination Removal System, e.g. a solid gas jet spray or ion cleaner.

BRIEF DESCRIPTION OF THE DRAWINGS

The invention will become more apparent from the following detailed specification and drawings in which.

DESCRIPTION OF PREFERRED EMBODIMENTS

Figure 1:
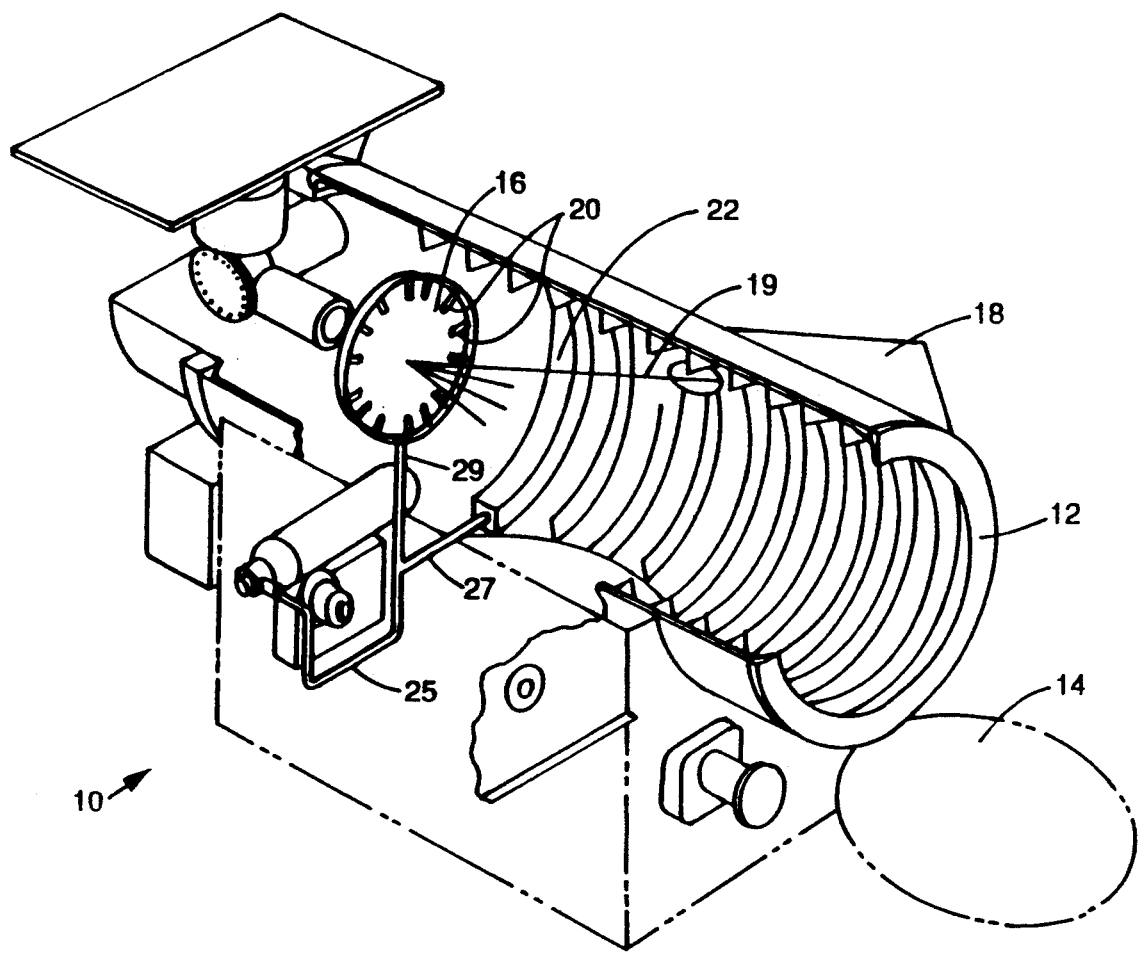
FIG. 1 is a perspective view of an optical instrument which houses a collector or getter either of the prior art or of the present invention.

Referring in more detail to the drawings, a space-based telescope 10 having a barrel 12, cover 14, primary optical component, e.g. mirror 16, having cleaning jets 20, and annular collector or getter 22, are mounted in the telescope barrel 12, as shown in FIG. 1. This telescope system is known in the prior art.

Figure 2:
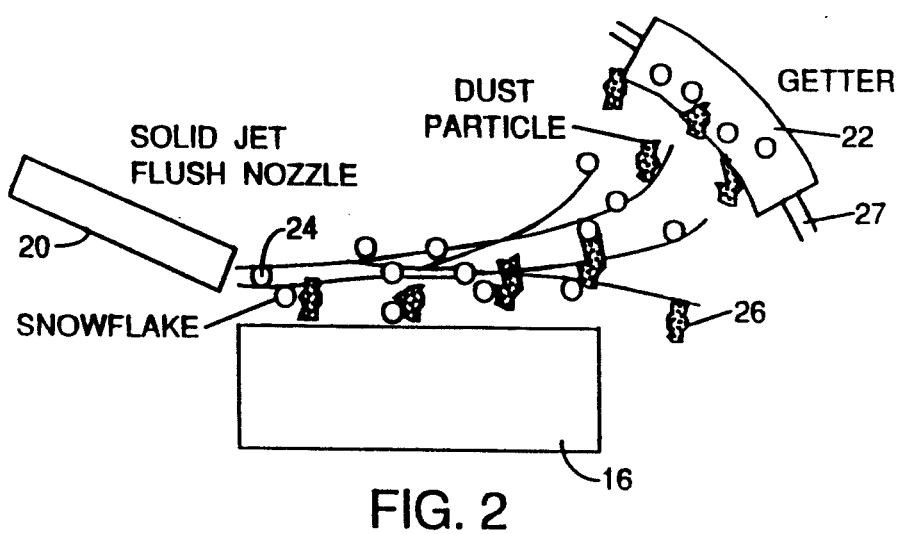
FIG. 2 is a fragmentary sectional elevation view schematic of a contaminant dislodging apparatus for a substrate.

As shown in FIG. 2, the mirror 16 of the above telescope employs cleaning nozzles or jets 20, which direct a solid/gas jet spray of snowflakes 24 against contaminant particles 26, to dislodge them from the surface of such mirror 16, as shown in FIG. 2. The so-dislodged particles 26 are then supposed to be captured by the getter 22 of FIG. 1.

Figure 3:
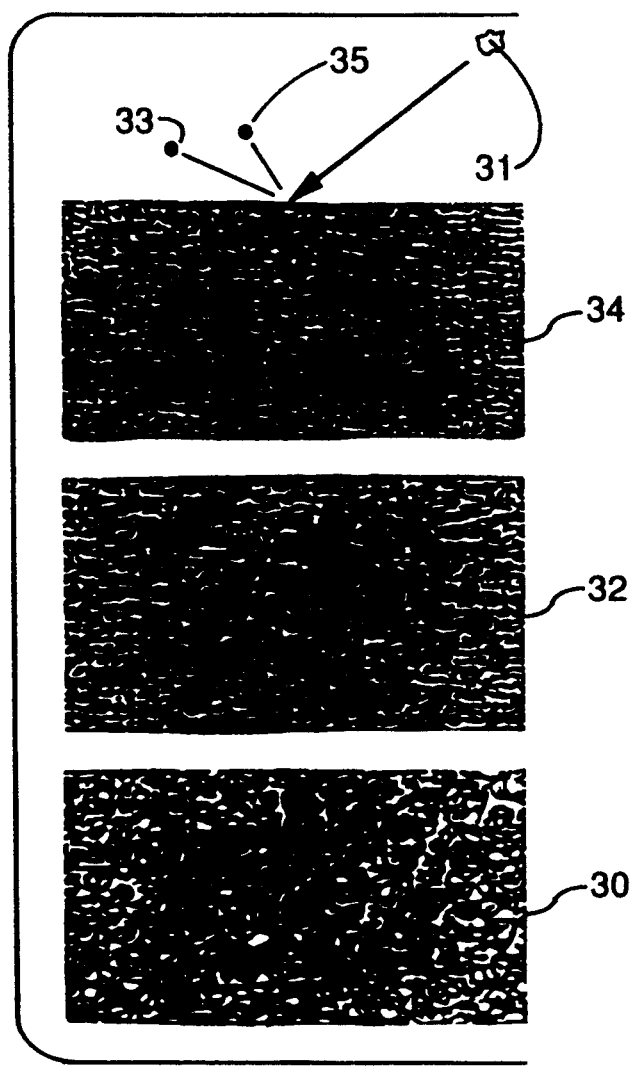
FIG. 3 is a plan view of mesh sections of getters of the prior art.

Prior art getters which have been discussed above, have included aluminum alloy mesh sections such as mesh section 30, having ten pores per inch, mesh section 32, having 20 pores per inch and mesh section 34, having 40 pores per inch, as shown in FIG. 3.

As noted previously, the above aluminum alloy mesh getters are brittle, are subject to desorption of the captured particles and are subject to ablation upon collision therewith by the so-dislodged particles. That is, as shown in FIG. 3, particle 31, upon collision with getter mesh section 34 causes ablation and launching of two aluminum mesh particles 33 and 35 as shown. Thus the capture and retention rate of contaminant particle (and molecules) by prior art getters is unacceptably low and many of these non-captured particles can redeposit on optical components or float in the optical sensor's field of view.

Figure 4:
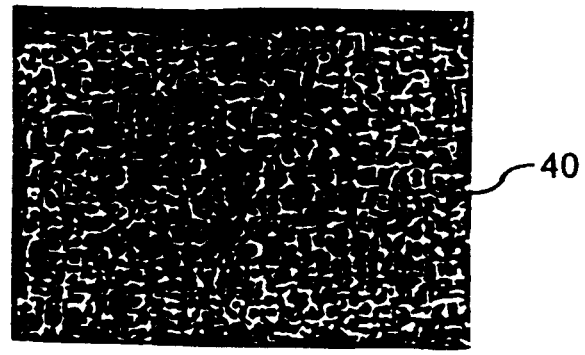
FIG. 4 is a plan view of a section of a contaminant getter according to the present invention which can be employed in the optical instrument shown in FIG. 1.

To alleviate the above problems, the getter of the present invention is provided. That is, a low-density, porous material is coated onto a metal mesh section to provide an improved contaminant getter according to the invention. For example, as shown in FIG. 4, metal mesh section 40 has an ultra-low density (ULD) silica aerogel condensed thereon to provide an effective and improved getter according to the present invention, which attracts and holds contaminant particles or molecules, thus enhancing the contaminant cleaning process, e.g. in an optical telescope such as shown in FIG. 1.

In FIG. 1 is also shown an electron gun 18 which (by electron beam 19) is used to sputter molecular contaminants from optical surfaces. Also, the jet spray nozzles 20 direct snowflakes within a gas stream at the substrate 16, per FIG. 2, to remove contaminate particles. As the comtaminants are removed from the optical surface, they are attracted to and held by the getter 22 of the invention, as shown in FIG. 2.

Also, as shown in FIG. 1, a coolant line 25 (for, e.g. liquid $N_2$) divides into cooling branch lines 27 and 29, as shown in FIG. 1. Coolant line 29 connects with and cools primary mirror 16 while coolant branch line 27 connects with and cools getter 22 as shown in FIG. 1 and indicated in FIGS. 2, 5 and 6. The getter may also be cooled using a cryocooler by means known in the art.

Figure 5:
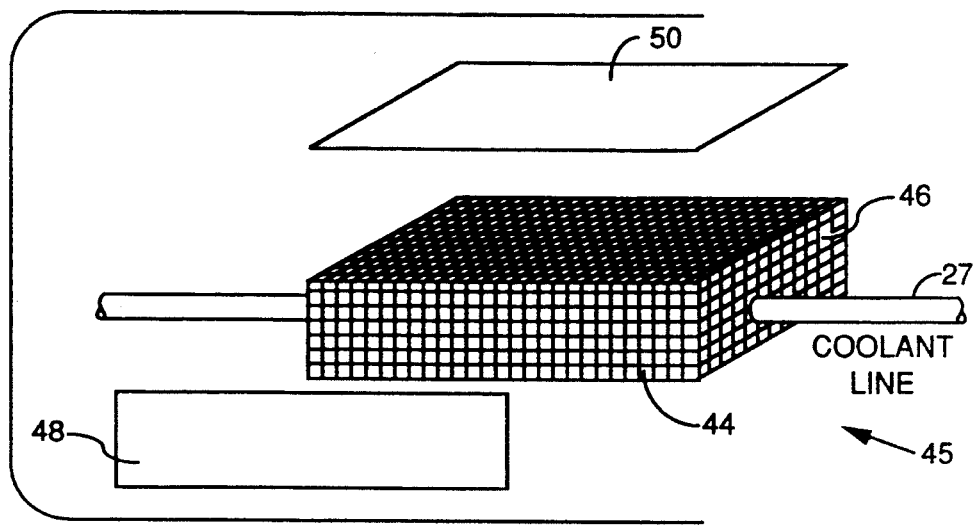
FIG. 5 is a perspective view of a composite getter according to the present invention.
Figure 6:
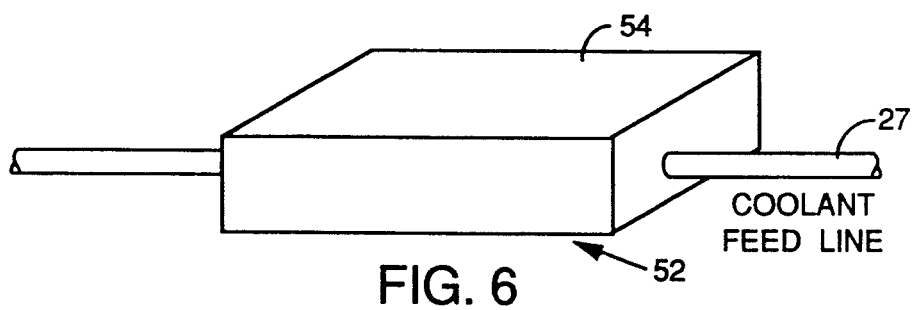
FIG. 6 is a perspective view of another composite getter embodying the present invention.

The metal mesh segment of the invention is shown in two embodiments in FIGS. 5 and 6. Thus metal mesh block 44 has coolant branch line 27 running therethrough and is coated on its exterior surfaces with layers of silica aerogel, i.e. layers 46, 48 and 50 as shown in FIG. 5.

Alternatively another composite getter embodiment of the invention is shown in FIG. 6 wherein the metal mesh block 52 (which has coolant feed line 27 running therethrough) is encapsulated or coated throughout as well as on the exterior surfaces thereof) with low density silica aerogel 54, as shown in FIG. 6.

In either embodiment a getter surface coated with low density (including ULD) aerogel is presented to an oncoming particle which can collide with and imbed itself into the aerogel covering at the surface of the getter or below the surface thereof.

As noted above, the aerogel covering protects the metal mesh core or substrate thereunder from ablation upon impact by a fast-moving contaminant particle or molecule. At the same time the metal mesh core, e.g. mesh 44 of FIG. 5 or mesh 52 of FIG. 6, provides good thermal conductivity to the coolant feed line 27 and thus enable the fast cooling of the aerogel coating of the respective composite getter, the better to attract contaminants to the getter.

Thus the getter of the present invention is a fusion of a suitable metal mesh with a low density cellular foam, e.g. a silica aerogel having a preferred density of 3–30 mg/cc.

The components of the getter of the invention e.g. shown in FIGS. 4 and 6 complement each other in that the aerogel is flexible, hydrophilic, porous and has a high compliance tensor in low temperature environments. Aerogel also coats and protects the metal mesh from ablation upon particle impact, and attracts and holds such contaminant and prevents its redeposition on an optical surface. On its part, the metal mesh provides a reinforcing element to the aerogel covering and such mesh provides good thermal conductivity within such covering. This is important because a cold getter better attracts contaminants and the metal mesh's thermal conductivity serves to maintain the aerogel covering as cool as desired, e.g. in an optical instrument for attraction of contaminant particles or molecules.

A word about the method for preparing ULD silica aerogel employed in the getter of the present invention. While such method is not part of the present invention, the end product is and accordingly such method is briefly discussed. This is because the ULD aerogel employed in the getter of the present invention is different from more conventional aerogels which have greater density and thus greater weight, lower porosity, and lower particle absorption capability.

Conventional silica aerogel employs the hydrolysis and condensation of tetraethoxysilane (TEOS) and/or tetramethoxysilane (TMOS) to produce gels which are then supercritically extracted to a low-density silicon glass network. This single-step solgel process has been used for several years in producing materials with densities ranging from 20 to 1100 mg/cc. This method is suitable for preparing LD aerogels employed in the present invention. However, such method requires high temperatures, e.g. 400° C. and pressures, e.g. 300 bars and certain precautions may be required.

The present invention employs an aerogel preferably made by a two-step extraction process. The two-step process differs from a conventional solgel process in that it generally proceeds at lower temperatures and pressures than the above one-step process and instead of requiring an extremely dilute solution to gel as in the single-step reaction, a partially hydrolyzed, partially condensed polysilicate mixture is prepared from which the alcohol is replaced as the solvent and then this non-alcoholic solvent is supercritically extracted.

That is, the solvent replacement technique employs liquid carbon dioxide, $CO_2$, to purge the system of the alcohols and then supercritically extracts the replacement solvent, i.e. heats the system to a relatively low 40° C., (and e.g. 40 bars pressure) to drive off the $CO_2$. This leaves a very low density silicon dioxide network or aerogel, with densities ranging from 1–900 mg/cc.

In a more specific example, an aerogel getter of the invention is fabricated using the above technology by first preparing a condensed silica oil by reacting TMOS with a sub-stoichiometric amount of water in methanol, under acidic conditions, with the following molar ratios:

1 TMOS:1.3 $H_2O$: 2.4 MeOH: 10 HCl.

This mixture is then distilled, removing much of the methanol and leaving the silica oil (which includes the TMOS). The oil is then hydrolyzed:

1 TMOS: 4.0 $H_2O$

This reaction is done in a pyrex glass mold in the presence of a non-alcoholic basic diluent ($NH_4OH$). Also present in the glass mold is a metal mesh and a catalyst (referenced below). Gel times vary from 12–72 hours. The silica aerogel is obtained from this "alcogel" by using liquid carbon dioxide to purge the alcogel of alcohol and replace it with such liquid carbon dioxide (which keeps the aerogel pores open). Thereafter heat is applied to raise the temperature of such aerogel to about 40° C., to apply super-critical triple point extraction ($CO_2$ phase diagram) to drive off such replacement solvent in the autoclave. The temperature is ramped (up to about 40° C.) while pressure is controlled and when finished, the autoclave (and the dried porous aerogel) is purged with dry nitrogen. The aerogel-coated mesh or getter of the invention is then removed from the mold for testing, storage or for use in decontamination of optics.

For more information on the above two-step extraction process or solvent replacement technique, in preparing aerogels, see an article by Laurence Hrubish and Thomas Tillotson in a book entitled "Better Ceramics through Chemistry Part IV," Materials Research Society, MRS Press, Pittsburgh Pa., 1991, which article is incorporated herein by reference.

In an example of fabricating a composite getter, according to the present invention, an aluminum alloy mesh at e.g. 10 pores per inch, is placed in a pyrex glass mold in an autoclave and covered with a solution of TMOS and undergoes the above-mentioned hydrolysis and condensation reactions in the presence of a catalyst as more fully described in the above-cited publication. A gel forms around the wire mesh and the gel undergoes a two-step solvent extraction process in which methanol is replaced by liquid carbon dioxide as an intermediate solvent as noted above. The liquid carbon dioxide is then supercritically extracted using the triple-point (phase diagram) drying technique. The pH and solvent/solute mixing ratios are set to achieve aerogel densities on the order of 3–30 mg/cc. The autoclave is then purged with dry nitrogen as discussed above and the composite getter of the invention obtained.

As indicated above, the aerogel employed in the getter of the invention is suitably a silica aerogel which has been extracted to a low-density silica porous glass network. However other low density aerogels can be employed within the scope of the invention, including inorganics from the Periodic Table of The Elements, e.g. aerogels of SiC, CaF or Be and including organics, e.g., aerogels of resorcinol-formaldehyde and of melamine-formaldehyde.

The aerogel employed in the getter of the present invention has a density ranging from 3–900 mg/cc and preferably from 3–30 mg/cc.

The metal mesh components used in the composite getter of the present invention can be of aluminum alloy mesh or other metal mesh and can have pore sizes ranging from 5–100 pores per inch. Such metal mesh can be, e.g. coated with aerogel, per the invention, to form a coating thereon, e.g. of 30 to 500 microns thick.

The getter of the invention can be made in various shapes, e.g. annular as shown in FIG. 1 or other suitable shape and can be employed in decontamination of optical or other systems, on land, sea, in the air and preferably in space applications.

The composite getter of invention is suitable for use in 1) contamination prevention of small and large optical systems including telescopes, interplanetary and solar explorers and space stations, 2) contamination prevention for ground-based systems and components whether in clean rooms, test chambers, storage, transportation or operation, as well as 3) in semiconductor processing operations.

The composite getter of the invention serves also to collect and contain particulate and molecular contaminants in order to prevent their deposition onto sensitive optical surfaces during testing, storage, transportation, launch, deployment and operation of sensor systems.

The physics of low dennsity aerogels compensates for the shortcomings of metal mesh getters and is believed to represent a significant advance in getter design.

The composite getter of the invention is coated with a low-density, porous aerogel that, as noted above, has a high-compliance tensor in low-temperature environments. That is, the aerogel coating has a somewhat flexible surface so that upon being struck by a high-velocity particle, the surface will tend to liquify or soften and admit the particle and then hold it. In the prior art such high-velocity particle on impact, e.g. with a metal mesh getter, fractures and ablates the surface thereof, causing the formation of additional contaminant particles in the system.

In addition to the space-based application described above, the aerogel getter of the invention can be used with ground-based space simulation chambers during vacuum and vacuum cryogenic optical testing. It may also be placed inside of optical storage and transportation vessels as well as at semiconductor manufacturing and processing locations, to maintain required cleanliness levels.

In further embodiments of the invention, the AMCC embodying the invention, can be employed as air filters in, e.g. hospital rooms, as collectors and filters for environments in which virus and disease molecules can become airborne threats as aerosols. Such filters, which can also serve molecular sieves, are applicable to HIV hospital care units and biomedical research laboratories.

Figure 7:
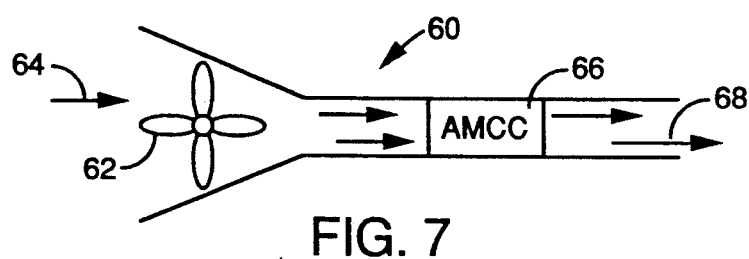
FIG. 7 is a sectional elevation, schematic view of a decontaminant filter system embodiment of the invention.

Thus per FIG. 7, in an air duct system 60 in, e.g. an operating room or a medical lab, circulating fan 62 pulls aerosol laden air into such duct 60 and through the AMCC 66 of the invention and removes, filters out or entraps, e.g. virus and disease molecules or other contaminants, outputting cleaner air 68, as shown in FIG. 7.

Such embodiment of the invention can find use in other applications. These applications include use in electronics medical equipment fan filters. In these high probability of hazardous aerosol type environments, electronic instrumentation, most of which contains small cooling fans, creates air currents. Airborne contaminants are swept up in air currents created by these fans, to be scattered. Aerogel mesh filters (or AMCCs) for these fans, would not only act as molecular sieves but also chemically bond, e.g. to viral species.

Figure 8:
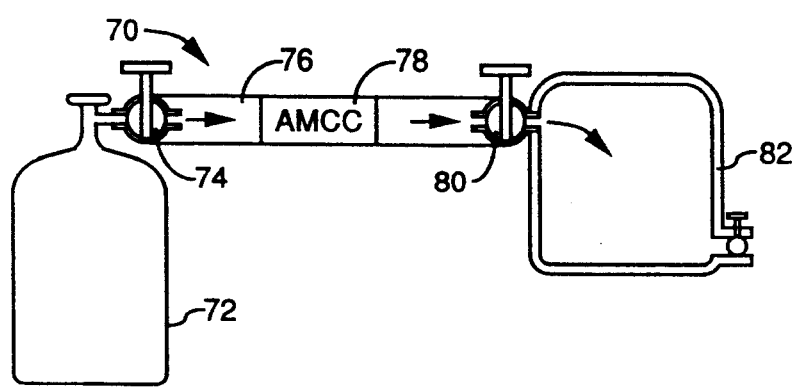
FIG. 8 is a sectional elevation schematic view of another decontaminant filter system embodiment of the invention.

In another embodiment, a gas purifying and collection system 7, employing an AMCC sieve of the invention, is shown in FIG. 8. Here a bottle 72 of semi-purified gas, e.g. silane gas having silica particles therein, feeds through valve 74, pipeline 76, AMCC 78 and valve 80 into storage in a vacuum bottle 82, as shown in FIG. 8. Here the aerogel mesh filter of the invention (AMCC) collects the solid silica particles, and/or molecules, passing a purified silane gas into the vacuum bottle 82, as indicated in FIG. 8.

Thus the system of FIG. 8 can be employed for providing high quality gas i.e. $SiH_4$, which gas is filtered by the AMCC of the invention, e.g. to remove $SiO_x$ particles and water molecules (which can condense in the gas line 76 of FIG. 8) and obtain a purified silane gas in the vacuum chamber 82 for use in fabricating silica thin films and semiconductors in a high purity environment.

Such purifier systems embodiment of the invention can be employed biotechnically to pass aerosols of micro-organisms through such decontamination system 70 and through the AMCC 78 which, dependent upon pore size (of the aerogel mesh filter), will pass smaller molecules or micro-organisms and prevent larger molecules or micro-organisms from entering the vacuum chamber 82, as indicated in FIG. 8 hereof. Accordingly, this embodiment of the invention provides a biotechnology filter for micro-organism (or other particle) sizing within the scope of the invention.

The AMCC of the invention also finds application in an IC nano-fabrication or microfabrication mask aligner and UV exposer. In this apparatus, a high precision microcircuit is lithographed by large scale mechanical motion in a robotic system. IC features at submicron dimensions are created. At the same time, the robotic motion of the system creates aerosols of particulate and molecular species at submicron spatial dimension (as a colloid's inertia is characterized by Brownian motion). Also, the UV light employed in such apparatus can photopolymerize these aerosol particles. Accordingly, several strategically placed AMCCs are required herein to obviate the above micro and nano contamination threat.

Figure 9:
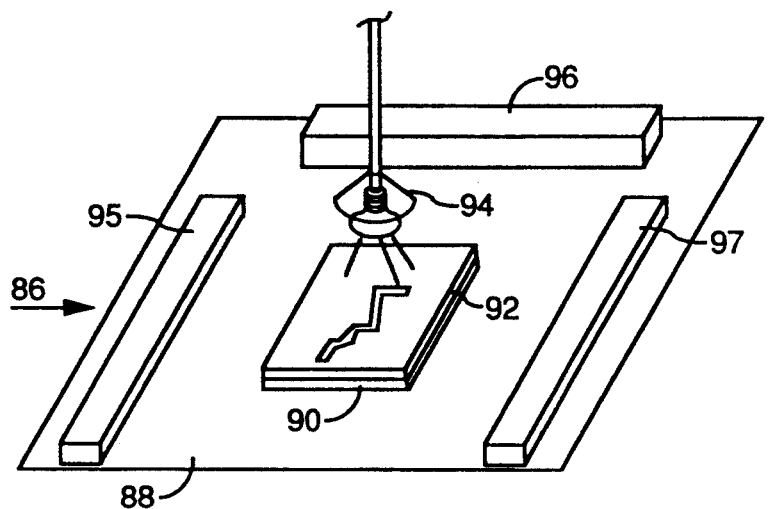
FIG. 9 is an isometric schematic view of another composite getter decontamination system embodiment of the invention.

Thus with reference to FIG. 9, mask fabrication apparatus 86 has stage 88 which supports a photographic plate 900 under mask 92, in turn under UV lamp 94, as shown in FIG. 9. On such stage 88, 3 AMCCs 95, 96 and 97 are positioned around the plate 90, mask 92 and UV lamp 94, as shown in FIG. 9. As always, the AMCCs are maintained at low temperature to attract decontaminants, including aerosols of particulate and molecular species emanating from the motion of the robotic system (not shown).

In another embodiment, in offices and print shops, the AMCC embodying the invention is advantageously employed. Thus in photocopiers, FAX machines and computer printers, the black carbon-base toner is a constant source of airborne contamination which collects on the interior surfaces of these machines. The insertion of one or more embodiments of the AMCC of the invention, in various suitable shapes, inside these machines, provides a means to collect, e.g. toner fog (carbon or dried paint particles in air), serves to prolong copier use time between failure and makes for cleaner air quality in the room or office housing these machines.

The AMCC embodying the invention also finds needed use as on-chip getters. That is, in semiconductors today, the microchip offgases and conventional silica gel getters, collect and contain contaminants (e.g. water) up to approximately 150° C. Aerogel mesh heterostructure in the AMCC of the invention can collect and contain contaminants at temperatures reaching 300° C. before offgassing. This is believed a significant advance in the state of the art when such AMCCs are used with microchips, which translates into an increased lifetime and hence higher reliability of microchip circuits.

Figure 10:
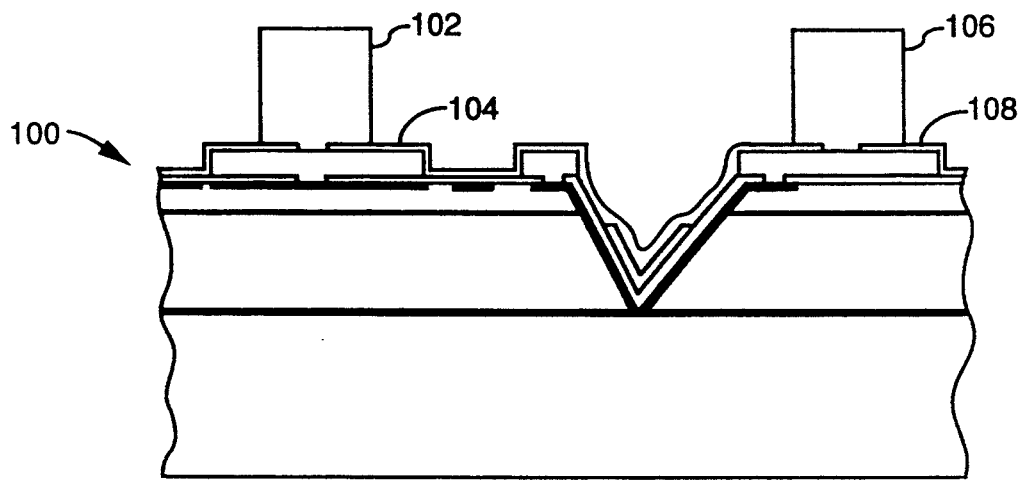
FIG. 10 is a sectional elevation schematic view of yet another composite getter decontamination system embodiment of the invention.

Thus in one embodiment the microchip assembly or circuit board 100, has AMCC or getter 102, mounted upright proximate microchip 104 and has upright getter 106, mounted proximate microchip 108, as shown in FIG. 10.

Figure 11:
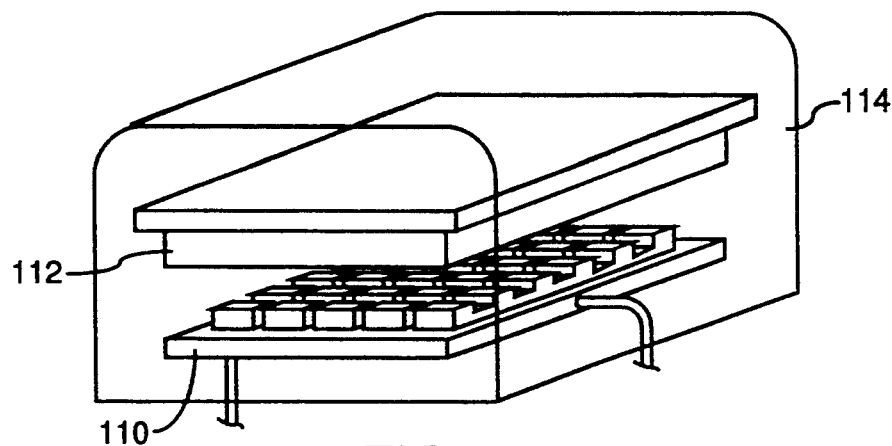
FIG. 11 is a perspective schematic view of still another composite getter decontamination system embodiment of the invention and FIG. 12 is a perspective schematic view of a contaminate removal and composite getter, decontamination system embodiment of the invention.

In a related embodiment, microchip assembly or circuit board 110, has AMCC of the invention or getter 112 mounted thereover within clear thermoplastic housing 114 as shown in FIG. 11.

Another embodiment of the invention is the AMCC/CRS which can remove as well as collect contaminants over a wide temperature range in vacuum or ambient environments. As noted above, CRS means contamination removal system. One embodiment of such a system is shown in FIG. 2 and has already been discussed above.

Figure 12:
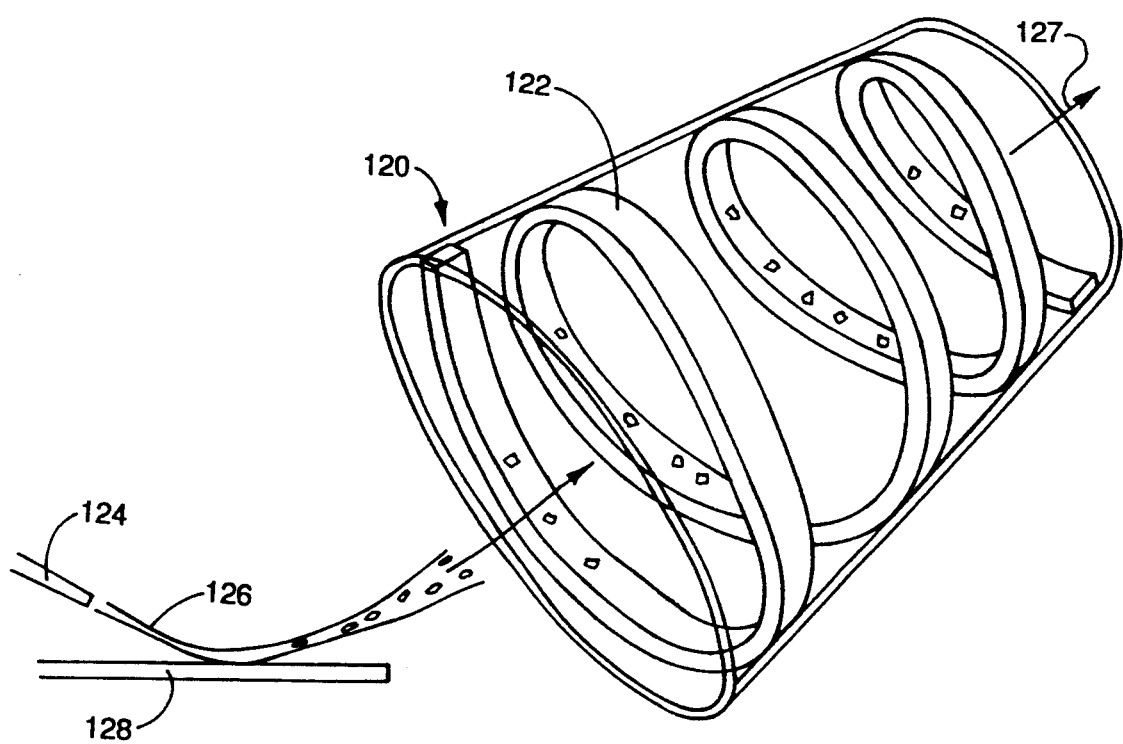

Another AMCC/CRS embodiment of the invention is shown in FIG. 12 wherein open-ended waste container 120 has mounted therein a helically wound getter 122. Also as shown in FIG. 12, a jet spray or ion beam gun 124 (known in the prior art) directs, e.g. a spray of air and snow flakes 126, at an IC substrate or chip 128. The spray removes contaminants from such substrate and directs them into the waste container 120 where such contaminants of particles and/or molecules are mostly collected by the getter 122 therein, the decontaminated or less contaminated spray 127, exiting the waste container 120 as shown or indicated in FIG. 12.

The above contaminant removal and collection system embodiment of the invention, can be employed for cleaning of wafers and circuits thereof, the wafer holder, the process chamber and vacuum chuck cleaning as well. Further applications of the above contaminant removal and collection system include the cleaning of:

a) semiconductor wafers prior to and following processing,
b) deposition chambers and all equipment used for semiconductor processing,
c) any coating pre-processing operations, such as painting preparations where particulates in the air as well as the environment, can cause significant part reject rates and
d) hospital operating rooms in which surgical implements, surfaces (e.g. table tops) and instrumentation may be cleaned down to the micron sized contaminant level.

Other use seen for the getter embodying the invention include:

a) underground waste dumps. Here radioactive waste can react with the alkalai halides. The getter of the invention can be employed to collect and contain these species for further study.
b) hazardous waste incinerators and smoke stacks: the getter of the invention can be used as a collector in various stages of incinerators and smoke stacks and species collected for laboratory study and
c) in various mechanical systems with moving parts wherein a contamination free environment is required: for example, a cryocooler (used in spacecraft systems) in which moving parts create contaminants which eventually degrade performance. A small aerogel mesh getter of the invention can alleviate this contamination source and extend the mission lifetime of the spacecraft and tactical sensor systems using cryocoolers.

In an operating room or cleanroom, or in a room containing paint vapors, one can advantageously use the fan filter assembly of FIG. 7 and the jet spray-waste container system of FIG. 12, for thorough decontamination thereof.

Thus in the embodiments discussed above, the effectiveness of Applicants' getter embodiments are shown, e.g. for decontaminating metal, glass, ceramic, semiconductor and polymer substrates. This system applies to both cleanroom and cryogenic-vacuum conditions such as spacecraft environments. In addition the AMCC or getter can be used in a stand alone configuration in which it collects contaminants in "flypaper" fashion or as a gas/air filtration system. The getter of the invention is believed an advance in the state of the art getter technology because it can collect and contain both molecular and particulate contaminants over a wide temperature range. Additionally, the AMCC/CRS embodiments of the invention can remove as well as collect and contain contaminants over a wide temperature range, in vacuum or ambient conditions.

Thus the above getter embodiments of the invention find application in, e.g. semiconductor processing, biomedical laboratores, hospital operating rooms, computers and electronic equipment, office and printing equipment, hazardous waste handling systems, gas filtration systems, semiconductor devices (on-chip in situ getters) and spacecraft systems.

What is claimed is:

1. A decontamination system having a porous, light weight composite getter which collects particulate and molecular contaminates, said getter comprising a three-dimensional metal mesh matrix having a porosity of 5–100 pores per inch, said metal mesh matrix being completely coated on the exterior surfaces thereof with a low-density porous aerogel having a density of 1–500 mg/cc, said getter being mounted in a gas duct for removing contaminants from gas flowing through said duct.

2. The getter of claim 1 serving as a filter in a forced air duct for removal of airborne contaminants including dust, paint vapors, infectious viruses and molecules and hazardous waste.

3. The getter of claim 1 mounted in a duct between a source of gas with particles and a vacuum chamber for filtering out certain size particles or molecules from the gas flowing to said vacuum chamber.

4. The getter of claim 3 wherein said gas is air containing biotechnical micro-organisms, at least some of which are filtered out before the air flows into said vacuum chamber.

5. The getter of claim 3 wherein said gas is silane gas containing particles including silica and $SiH_x$, at least some of which particles are filtered out from said gas by said getter.

6. A decontamination system having a porous, light weight composite getter which collects particulate and molecular contaminates, said getter comprising a three-dimensional metal mesh matrix having a porosity of 5–100 pores per inch, said metal mesh matrix being completely coated on the exterior surfaces thereof with a low-density porous aerogel having a density of 1–500 mg/cc, said getter being mounted in a photocopy machine, computer printer or FAX machine for capture of toner fog and other contaminates.

7. A decontamination system having a porous, light weight composite getter which collects particulate and molecular contaminates, said getter comprising a three-dimensional metal mesh matrix having a porosity of 5–100 pores per inch, said metal mesh matrix being completely coated on the exterior surfaces thereof with a low-density porous aerogel having a density of 1–500 mg/cc, which getter has a curved shape and is mounted in a tubular open-ended housing for capture of contaminates from a gas passing therethrough.

8. The getter of claim 7 having a frustro-conical shape with a getter mounted therein in the shape of a helix or Archimedes spiral.

9. A decontamination system having a porous, light weight composite getter which collects particulate and molecular contaminates, said getter comprising a three-dimensional metal mesh matrix having a porosity of 5–100 pores per inch, said metal mesh matrix being completely coated on the exterior surfaces thereof with a low-density porous aerogel having a density of 1–500 mg/cc, which getter is mounted in places selected from the group consisting of operating rooms, cleanrooms, storage areas for surgical instruments, spacecraft, machines and areas for manufacture of semiconductors.

10. At least one getter of claim 9 being mounted proximate a stage for nanofabrication of a microchip assembly microcircuit, for capture of particulate and molecular contaminates that might otherwise contaminate said microcircuit.

11. The getter of claim 9 mounted near a semiconductor circuit for capture of contaminates including off-gassing contaminates from the microchips in said circuit.

12. The getter of claim 9 mounted near semiconductor wafers during manufacturing and later in use, for collecting contaminates proximate thereto.

* * * * *